United States Patent
Zhang et al.

(10) Patent No.: US 11,293,448 B1
(45) Date of Patent: Apr. 5, 2022

(54) NEGATIVE-PRESSURE BALANCE SYSTEM FOR GEAR BOX OF CENTRIFUGAL COMPRESSOR

(71) Applicant: Ningbo Fengte Machinery Equipment Co., Ltd., Cixi (CN)

(72) Inventors: Yong Zhang, Cixi (CN); Yayu Zheng, Cixi (CN); Hesheng Tang, Cixi (CN)

(73) Assignee: NINGBO FENGTE MACHINERY EQUIPMENT CO., LTD., Cixi (CN)

( * ) Notice: Subject to any disclaimer, the term of this patent is extended or adjusted under 35 U.S.C. 154(b) by 0 days.

(21) Appl. No.: 17/448,525

(22) Filed: Sep. 23, 2021

Related U.S. Application Data

(63) Continuation of application No. PCT/CN2021/073824, filed on Jan. 26, 2021.

(30) Foreign Application Priority Data

Jan. 11, 2021 (CN) .......................... 202011073517.5

(51) Int. Cl.
  *F04D 17/10* (2006.01)
  *F16H 57/04* (2010.01)
  (Continued)

(52) U.S. Cl.
  CPC .......... *F04D 25/028* (2013.01); *F04D 17/10* (2013.01); *F16H 57/027* (2013.01); *F16H 57/0404* (2013.01); *F16N 39/002* (2013.01)

(58) Field of Classification Search
  CPC .... F16H 57/027; F16H 57/0404; F04D 17/10; F04D 25/028; F16N 39/002
  See application file for complete search history.

(56) References Cited

U.S. PATENT DOCUMENTS

| 2,802,548 A * | 8/1957 | Mart | .............. F16H 57/0415 184/104.1 |
| 3,489,034 A * | 1/1970 | Moore | ............ F16H 57/0409 74/606 R |

(Continued)

FOREIGN PATENT DOCUMENTS

| CN | 101949447 A | 1/2011 |
| CN | 105276131 A | 1/2016 |

(Continued)

*Primary Examiner* — Daniel D Yabut
(74) *Attorney, Agent, or Firm* — Bayramoglu Law Offices LLC

(57) ABSTRACT

A negative-pressure balance system for a gearbox of a centrifugal compressor includes the gearbox, a hermetically-sealed low-level oil collecting tank and a U-shaped negative-pressure balance pipe. The gearbox is connected to a respirator, and the back pressure of the respirator is a local ambient atmospheric pressure. The bottom of the gearbox and the low-level oil collecting tank are connected by an oil conduit. An oil demister communicated with the low-level oil collecting tank is mounted at the top of the low-level oil collecting tank. The oil demister at least includes a ventilation device. The respirator is communicated with a front-end lubricating point in the gearbox. One end of the U-shaped negative-pressure balance pipe is communicated with the respirator, and the other end of the U-shaped negative-pressure balance pipe is communicated with a rear-end lubricating point in the gearbox.

3 Claims, 1 Drawing Sheet

(51) Int. Cl.
*F16H 57/027* (2012.01)
*F04D 25/02* (2006.01)
*F16N 39/00* (2006.01)

(56) References Cited

U.S. PATENT DOCUMENTS 3,670,850 A * 6/1972 Swearingen .......... F16N 39/002
277/432
2004/0173051 A1 9/2004 Sinka et al.

FOREIGN PATENT DOCUMENTS

| | | |
|---|---|---|
| CN | 106195234 A | 12/2016 |
| CN | 205877148 U | 1/2017 |
| DE | 102014008116 A1 | 12/2015 |

* cited by examiner

NEGATIVE-PRESSURE BALANCE SYSTEM FOR GEAR BOX OF CENTRIFUGAL COMPRESSOR

CROSS REFERENCE TO THE RELATED APPLICATIONS

This application is the Continuation Application of International Application No. PCT/CN2021/073824, filed on Jan. 26, 2021, which is based upon and claims priority to Chinese Patent Application No. 202011073517.5, filed on Jan. 11, 2021, the entire contents of which are incorporated herein by reference.

TECHNICAL FIELD

The present invention is regarding a negative-pressure balance system for a gearbox of a centrifugal compressor.

BACKGROUND

In a gear speed-increasing centrifugal compressor unit, an impeller of a working end is fixed on a high-speed shaft. On one hand, increasing the speed of the big gear causes the impeller connected to the high-speed shaft to gain tens of thousands of speed rotations in operation. On the other hand, for the gear speed-increase meshing point, high-speed bearings and other friction pairs require lubricating oil for effective lubrication and cooling. Meanwhile, when the lubricating oil finishes lubrication and refrigeration of each lubricating point, it is necessary to ensure that the lubricating oil can be discharged out of the gearbox efficiently and quickly to avoid poor draining of the oil or the accumulation of lubricating oil at the bottom of the gearbox.

When the oil discharge process is not smooth or the lubricating oil accumulates in the gearbox, it could cause the big gear to dip into the oil during operation, resulting in additional power dissipation and mechanical loss, the temperature of the lubrication oil to rise to extremely high levels, as well as other adverse effects. Therefore, in terms of the high-power, high-efficiency and energy-saving of the centrifugal compressor unit, in order to improve the operational efficiency of the compressor unit and reduce the mechanical loss, it is particularly important to achieve efficient and rapid oil return after lubrication of each meshing point and friction pair in a gearbox.

SUMMARY

An objective of the present invention is to provide a negative-pressure balance system for a gearbox of a centrifugal compressor to solve the problems raised in the above background technology.

In order to achieve the above objective, the present invention provides the following technical solutions.

A negative-pressure balance system for a gearbox of a centrifugal compressor includes: a gearbox, where the gearbox is connected to a respirator, and the back pressure of the respirator is a local ambient atmospheric pressure; and a hermetically-sealed low-level oil collecting tank, where the low-level oil collecting tank is located below the gearbox.

The bottom of the gearbox and the low-level oil collecting tank are connected by an oil conduit.

An oil demister communicated with the low-level oil collecting tank is mounted at the top of the low-level oil collecting tank. The oil demister at least includes a ventilation device, and the volume of ventilated air of the oil demister in operation is greater than the leakage amount from the internal space of the gearbox, to establish a negative pressure not only in the low-level oil collecting tank, but also in the internal space of the gearbox.

The respirator is communicated with a front-end lubricating point in the gearbox.

The negative-pressure balance system for the gearbox of the centrifugal compressor further includes a U-shaped negative-pressure balance pipe. One end of the U-shaped negative-pressure balance pipe is communicated with the respirator, and the other end of the U-shaped negative-pressure balance pipe is communicated with a rear-end lubricating point in the gearbox.

Further, the oil demister includes a filter cylinder communicated with the low-level oil collecting tank. The filter cylinder is provided with filter material, and the ventilation device is arranged on the filter cylinder.

Further, the ventilation device includes a driving motor and a suction fan driven by the driving motor, and the low-level oil collecting tank is ventilated by the suction fan.

The working principle of the present invention is as follows. When the ventilation device of the oil demister performs ventilation, a certain negative pressure is formed in the low-level oil collecting tank. The low-level oil collecting tank and the bottom of the gearbox are connected by an oil conduit. Since the oil conduit is not fully filled during oil guide, the interior of the gearbox and the low-level oil collecting tank are communicated with each other. Thus, the negative pressure is also established in the internal space of the gearbox. Meanwhile, considering that the gearbox is not completely sealed, for instance, there always exists a certain air pressure leakage at the flange joint, etc., it is stipulated that the volume of ventilated air of the oil demister in operation is greater than the leakage amount produced by the internal space of the gearbox, to ensure the negative pressure in the gearbox.

When the leakage amount of the gearbox and the volume of ventilated air reach a certain balance, the negative pressure remains constant. When the lubricating oil completes lubrication of each lubricating point in the gearbox (each lubricating point in the gearbox refers to the section in the gearbox required to be lubricated, such as gear meshing point and the like. Along the flow path of the lubricating oil, the lubricating point at the front end of the path is the front-end lubricating point, and the lubricating point at the rear end of the path is the rear-end lubricating point), under the combined action of the difference between front and rear oil pressures and the negative pressure in the gearbox, the lubricating oil flows quickly to the bottom of the gearbox and flows back to the low-level oil collecting tank through the oil conduit to complete a lubrication cycle.

In the initial stage of the return of the lubricating oil and the establishment of the negative pressure in the gearbox, the oil level in the gearbox rises, and the lubricating oil flows into the U-shaped negative-pressure balance pipe at the rear-end lubricating point to achieve the function of sealing and isolating from the external pressure.

When the negative pressure is stable, the liquid level difference in the U-shaped negative-pressure balance pipe remains constant. Since the respirator is communicated with the atmospheric environment, the liquid level on one side of the U-shaped negative-pressure balance pipe is communicated with the rear-end lubricating point which is higher than the liquid level on the other side of the U-shaped negative-pressure balance pipe communicated with the respirator.

When the negative pressure is excessively high, the liquid level difference in the U-shaped negative-pressure balance pipe increases, and the liquid level on one side of the U-shaped negative-pressure balance pipe communicated with the rear-end lubricating point rises. When the liquid level increases to the highest point on this side, the excess lubricating oil will flow back to the gearbox to maintain the internal negative pressure within a certain scope.

When the negative pressure is excessively low, the oil return speed of the gearbox slows, and some of the lubricating oil may accumulate at the bottom of the gearbox. Meanwhile, the internal volume communicated with the oil demister is reduced. Due to the constant volume of ventilated air, the negative pressure is quickly increased, the lubricating oil at the bottom of the gearbox returns quickly, and the internal negative pressure is gradually balanced and stable.

Compared with the prior art, the present invention has the following advantages: the rapid oil return can be achieved at each lubricating point under the action of pressure difference, to reduce the mechanical loss of the compressor unit and improve the operation efficiency.

DETAILED DESCRIPTION OF THE EMBODIMENTS

The technical solutions in the embodiments of the present invention will be described clearly and completely in conjunction with the drawings in the embodiments of the present invention. Obviously, the described embodiments are only a part of the embodiments of the present invention, not all embodiments. Based on the embodiments of the present invention, all other embodiments obtained by those skilled in the art without creative work shall fall within the scope of the protection of the present invention.

Figure 1:
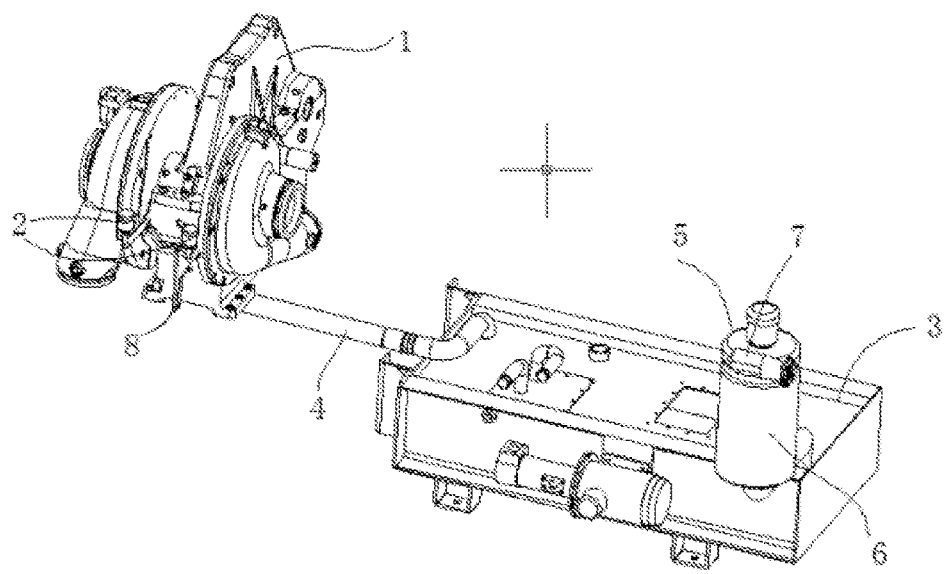
FIG. 1 shows a schematic diagram of the structure of a negative-pressure balance system for a gearbox of a centrifugal compressor.
Figure 2:
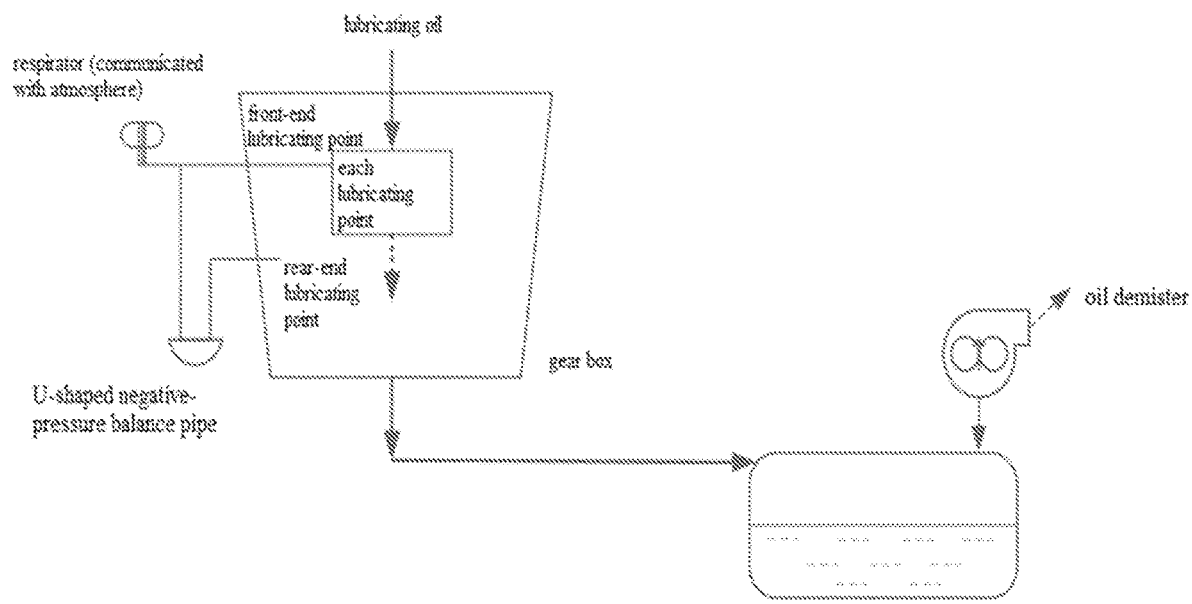
FIG. 2 shows a schematic diagram of the gearbox negative-pressure balance system in the negative-pressure balance system for the gearbox of the centrifugal compressor.

Referring to FIGS. 1 and 2, a negative-pressure balance system for a gearbox of a centrifugal compressor includes the gearbox 1. The gearbox 1 is connected to the respirator 2. The respirator 2 is communicated with the front-end lubricating point in the gearbox, and the back pressure of the respirator 2 is the local ambient atmospheric pressure.

The negative-pressure balance system for the gearbox of the centrifugal compressor further includes the hermetically-sealed low-level oil collecting tank 3. The low-level oil collecting tank 3 is located below the gearbox 1, and the bottom of the gearbox 1 and the low-level oil collecting tank 3 are connected by the oil conduit 4. The lubricating oil in the gear box 1 is returned through the oil conduit 4.

The oil demister 5 communicated with the low-level oil collecting tank 3 is mounted at the top of the low-level oil collecting tank 3. The oil demister 5 at least includes the ventilation device, and the volume of ventilated air of the oil demister 5 in operation is greater than the leakage amount from the internal space of the gearbox 1, to establish the negative pressure not only in the low-level oil collecting tank 3, but also in the internal space of the gearbox 1. The oil demister 5 is a conventional device in the art. The oil demister includes the filter cylinder 6 communicated with the low-level oil collecting tank 3, and the filter cylinder 6 is provided with filter material (such as filler, filter cotton and others). The ventilation device is arranged on the filter cylinder, and the ventilation device includes the driving motor 7 and the suction fan driven by the driving motor. The low-level oil collecting tank 3 is ventilated by the suction fan.

The negative-pressure balance system for the gearbox of the centrifugal compressor further includes the U-shaped negative-pressure balance pipe 8. One end of the U-shaped negative-pressure balance pipe 8 is communicated with the respirator 2, and the other end of the U-shaped negative-pressure balance pipe 8 is communicated with the rear-end lubricating point in the gearbox 1.

In the present invention, when the ventilation device of the oil demister 5 performs ventilation, a certain negative pressure is formed in the low-level oil collecting tank 3. The low-level oil collecting tank 3 and the bottom of the gear box 1 are connected by the oil conduit 4. Since, the oil conduit is not fully filled during oil guide, the interior of the gearbox and the low-level oil collecting tank are communicated with each other. Thus, the negative pressure is also established in the internal space of the gearbox 1. Meanwhile, considering that the gearbox 1 is not completely sealed, for instance, there always exists a certain leakage at the flange joint, etc., it is stipulated that the volume of ventilated air of the oil demister 5 in operation is greater than the leakage amount from the internal space of the gearbox 1, thereby ensuring the negative pressure in the gearbox 1.

When the leakage amount and the volume of ventilated air reach a certain balance, the negative pressure remains constant. When the lubricating oil completes lubrication of each lubricating point in the gearbox (each lubricating point in the gearbox refers to the section in the gearbox 1 required to be lubricated, such as gear meshing point and the like. Along the flow path of the lubricating oil, the lubricating point at the front end of the path is the front-end lubricating point, and the lubricating point at the rear end of the path is the rear-end lubricating point), under the combined action of the difference between front and rear oil pressures and the negative pressure in the gearbox, the lubricating oil flows quickly to the bottom of the gearbox 1 and flows back to the low-level oil collecting tank 3 through the oil conduit 4 to complete a lubrication cycle.

In the initial stage of the return of the lubricating oil and the establishment of the negative pressure in the gearbox, the oil level in the gearbox 1 rises, and the lubricating oil flows into the U-shaped negative-pressure balance pipe 8 at the rear-end lubricating point to achieve the function of sealing and isolating from the external pressure.

When the negative pressure is stable, the liquid level difference in the U-shaped negative-pressure balance pipe 8 remains constant. Since the respirator 2 is communicated with the atmospheric environment, the liquid level on one side of the U-shaped negative-pressure balance pipe 8 communicated with the rear-end lubricating point is higher than the liquid level on the other side of the U-shaped negative-pressure balance pipe 8 communicated with the respirator.

When the negative pressure is excessively high, the liquid level difference in the U-shaped negative-pressure balance pipe 8 increases, and the liquid level on one side of the U-shaped negative-pressure balance pipe 8 communicated with the rear-end lubricating point rises. When the liquid level increases to the highest point on this side, the excess lubricating oil will flow back to the gearbox 1 to maintain the internal negative pressure within a certain scope.

When the negative pressure is excessively low, the oil return speed of the gearbox slows, and some of the lubricating oil may be accumulated at the bottom of the gearbox. Meanwhile, the internal volume communicated with the oil demister is reduced. Due to the constant volume of ventilated air, the negative pressure is quickly increased, the lubricating oil at the bottom of the gearbox 1 returns quickly, and the internal negative pressure is gradually balanced and stable.

What is claimed is:

1. A negative-pressure balance system for a gearbox of a centrifugal compressor, comprising:
   the gearbox, wherein the gearbox is connected to a respirator, and a back pressure of the respirator is a local ambient atmospheric pressure; and
   a hermetically-sealed low-level oil collecting tank, wherein the hermetically-sealed low-level oil collecting tank is located below the gearbox;
   wherein, a bottom of the gearbox and the hermetically-sealed low-level oil collecting tank are connected by an oil conduit;
   an oil demister communicated with the hermetically-sealed low-level oil collecting tank is mounted at a top of the hermetically-sealed low-level oil collecting tank, and the oil demister at least comprises a ventilation device, and a volume of ventilated air of the oil demister in operation is greater than a leakage amount from an internal space of the gearbox, wherein a negative pressure is established not only in the hermetically-sealed low-level oil collecting tank, but also in the internal space of the gearbox;
   the respirator is communicated with a front-end lubricating point in the gearbox;
   the negative-pressure balance system for the gearbox of the centrifugal compressor further comprises a U-shaped negative-pressure balance pipe, wherein a first end of the U-shaped negative-pressure balance pipe is communicated with the respirator, and a second end of the U-shaped negative-pressure balance pipe is communicated with a rear-end lubricating point in the gearbox.

2. The negative-pressure balance system for the gearbox of the centrifugal compressor according to claim 1, wherein the oil demister comprises a filter cylinder communicated with the hermetically-sealed low-level oil collecting tank, the filter cylinder is inside provided with a filter material, and the ventilation device is arranged on the filter cylinder.

3. The negative pressure balance system for the gearbox of the centrifugal compressor according to claim 2, wherein the ventilation device comprises a driving motor and a suction fan driven by the driving motor, and the hermetically-sealed low-level oil collecting tank is ventilated by the suction fan.

* * * * *